United States Patent
Chao et al.

(10) Patent No.: US 7,073,160 B2
(45) Date of Patent: Jul. 4, 2006

(54) SYSTEM AND METHOD FOR MULTI-PROJECT WAFER SHUTTLE SERVICE

(75) Inventors: Jen-Lin Chao, Hsiangshan (TW); Chin Yung Chang, Hsinchu (TW)

(73) Assignee: Taiwan Semiconductor Manufacturing Co., Ltd., Hsinchu (TW)

( * ) Notice: Subject to any disclaimer, the term of this patent is extended or adjusted under 35 U.S.C. 154(b) by 366 days.

(21) Appl. No.: 10/750,750

(22) Filed: Jan. 2, 2004

(65) Prior Publication Data

US 2005/0149899 A1    Jul. 7, 2005

(51) Int. Cl.
G06F 17/50 (2006.01)
G06F 19/00 (2006.01)

(52) U.S. Cl. .......................................... 716/19; 700/121
(58) Field of Classification Search ............... 716/19; 700/121

See application file for complete search history.

(56) References Cited

U.S. PATENT DOCUMENTS

2006/0026549 A1 *   2/2006   Tsao et al. .................... 716/19

* cited by examiner

Primary Examiner—Paul Dinh
(74) Attorney, Agent, or Firm—Thomas, Kayden, Horstemeyer & Risley

(57) ABSTRACT

A system and method for MPW shuttle service. The system includes at least a first MPW shuttle reserving for a first group of device designs, a second MPW shuttle reserving for a second group of device designs, and a checking unit. The checking unit determines whether mask data for the first group has been provided by a cut off date for the first MPW shuttle, and exchanges a first target device design from the first group with a second target device design from the second group if the mask data of the first target device design has not been provided and that of the second target device design has been provided by the cut off date.

33 Claims, 6 Drawing Sheets

SYSTEM AND METHOD FOR MULTI-PROJECT WAFER SHUTTLE SERVICE

BACKGROUND

The present invention relates to MPW (Multi-Project Wafer) shuttle service and particularly to a system and method for MPW shuttle service with a mechanism to exchange devices between MPW shuttles.

Development of IC (Integrated Circuit) fabrication technology in the semiconductor industry has led to exponential growth in mask costs for each process. Taiwan Semiconductor Manufacturing Company (TSMC) has announced a foundry industry device prototyping service called Cyber shuttle or MPW shuttle service enabling designers to explore the benefits of leading-edge technology without committing to large volume wafer starts, and helping clients to shorten their new design development and reduce the development costs including the mask cost during trial production and characteristic evaluation on real chip trial stage. In addition, the MPW shuttle service dramatically reduces NRE (Non-Recurring Engineering) charges for small wafer volumes, enabling fast, low-cost prototyping.

The MPW shuttle service enables different clients to book an MPW shuttle and deliver their product design to the MPW shuttle service provider. Once all of the design information is received, each design will be translated and produced on a common mask with appropriate allocation. Subsequent to IC fabrication, the MPW shuttle service provider delivers the ICs to the corresponding clients.

FIG. 1 illustrates a schematic diagram of the MPW shuttle service. In FIG. 1, a mask 110 including product designs A (111), B (112) and C (113) is commonly produced for different clients. The mask 110 is transferred to each die 101 of the wafer 100 by photolithography. Subsequent to IC fabrication, the MPW shuttle service provider delivers IC products A (120), B (130) and C (140) to the corresponding clients. The MPW shuttle service enables clients to share costs by producing a common mask for rapid processing of new products and designs to silicon-proven and verification status.

The MPW shuttle service provider may provide a booking mechanism for clients to book specific MPW shuttles. A complete schedule of the MPW shuttle includes the three periods of MPW reservation and mask data preparation, mask production, and wafer start. The MPW shuttle is open for reservation until a cut off date, by which time clients must provide mask data for their booked product designs. Subsequent to the cut off date, the common mask is produced, and wafer fabrication begins.

FIG. 2 shows an example of an MPW shuttle MPWS1. The schedule of MPW shuttle MPWS1 includes the three periods P11, P12, and P13. In period P11, there are five device designs, D1~D5, booked on MPW shuttle MPWS1. However, mask data for device D3 has missed the cut off date T1 of MPW shuttle MPWS1. This presents two disadvantages. First, since MPW shuttle MPWS1 has reserved a position for device D3 and which shares the common mask, mask production period P12 is delayed to time T2 to await mask data for device D3. The subsequent wafer start period P13 is also delayed. Second, the device D3 could be pushed out of MPW shuttle MPWS1, and rescheduled on another MPW shuttle. If the successive MPW shuttle has no capacity for the device D3, the design cycle and prototyping will be seriously delayed.

FIG. 3 shows an example of two successive MPW shuttles MPWS1 and MPWS2. The MPW shuttles MPWS1 and MPWS2 are booked for devices D1~D5 and D6~D10 respectively. Similarly, the mask data of device D3 has missed cut off date T1 for MPW shuttle MPWS1. Mask data for device D8, however, has met the cut off date T1 for MPW shuttle MPWS1. In practice, there is no existing solution to exchange devices between MPW shuttles. Therefore, MPW shuttle MPWS1 is delayed, and device D8 is still scheduled to be processed with MPW shuttle MPWS2 although its mask data has already been provided. In addition, the conventional MPW shuttle service does not provide a pull-in function, in which a pull-in demand for a specific device design means a specific device design requires priority fabrication. Conventionally, all devices are processed equally regardless of priority status.

SUMMARY

The present invention is proposed to solve the aforementioned issues. It should be noted that, although this invention will be described from the perspective of an IC foundry, its concept and spirit should not be limited to IC foundries but may be applicable to other factories, service suppliers and products.

Accordingly, it is an object of the present invention to provide a system and method for a MPW (Multi-Project Wafer) shuttle service that exchanges devices or device designs between MPW shuttles.

To achieve the above objective, the present invention provides a system and method for MPW shuttle service. According to one embodiment of the invention, the system includes a first MPW shuttle reserved for a first group of device designs, a second MPW shuttle reserved for a second group of device designs, and a checking unit. The checking unit determines whether mask data for the first group on the first MPW shuttle has been provided by the cut off date. A first target device design from the first group is exchanged with a second target device design from the second group if the mask data of the first target device design has not been provided and the second target device design has been provided by the cut off date.

The system further includes a mask production unit to produce a common mask according to the mask data in the first group after the cut off date, the checking unit further releases the first MPW shuttle to a production line, and wafer fabrication according to the common mask begins.

The system further includes a reservation unit for booking device designs on the first or second MPW shuttle. The checking unit further updates a first booking record of the first MPW shuttle to include the second device design, and updates a second booking record of the second MPW shuttle to include the first device design via the reservation unit.

According to another embodiment of the invention, a method for MPW shuttle service is provided in which it is first determined whether mask data for a first group reserved on a first MPW shuttle has been provided by a cut off date. A first target device design from the first group is exchanged with a second target device design from the second group if the mask data of the first target device design has not been provided and the second target device design has been provided by the cut off date.

According to the method, a common mask is produced according to the mask data of the first group after the cut off date starts the first MPW shuttle, and wafer fabrication according to the common mask begins.

The method further updates a first booking record of the first MPW shuttle to include the second device design, and updates a second booking record of the second MPW shuttle to include the first device design.

The above-mentioned method may take the form of program code embodied in a tangible media. When the program code is loaded into and executed by a machine, the machine becomes an apparatus for practicing the invention.

One feature of the present invention is to locate a seat on the successive MPW shuttle for the delayed device, allowing the MPW shuttle to start on schedule.

Another feature of the present invention is to locate a seat for a device that has provided mask data or has a pull-in demand, to reduce MPW shuttle cost.

A detailed description is given in the following embodiments with reference to the accompanying drawings.

BRIEF DESCRIPTION OF THE DRAWINGS

The aforementioned objects, features and advantages of this invention will become apparent by referring to the following detailed description of the preferred embodiment with reference to the accompanying drawings, wherein.

DESCRIPTION

The present invention provides a system and method for overcoming conventional MPW shuttle service problems.

Figure 1:
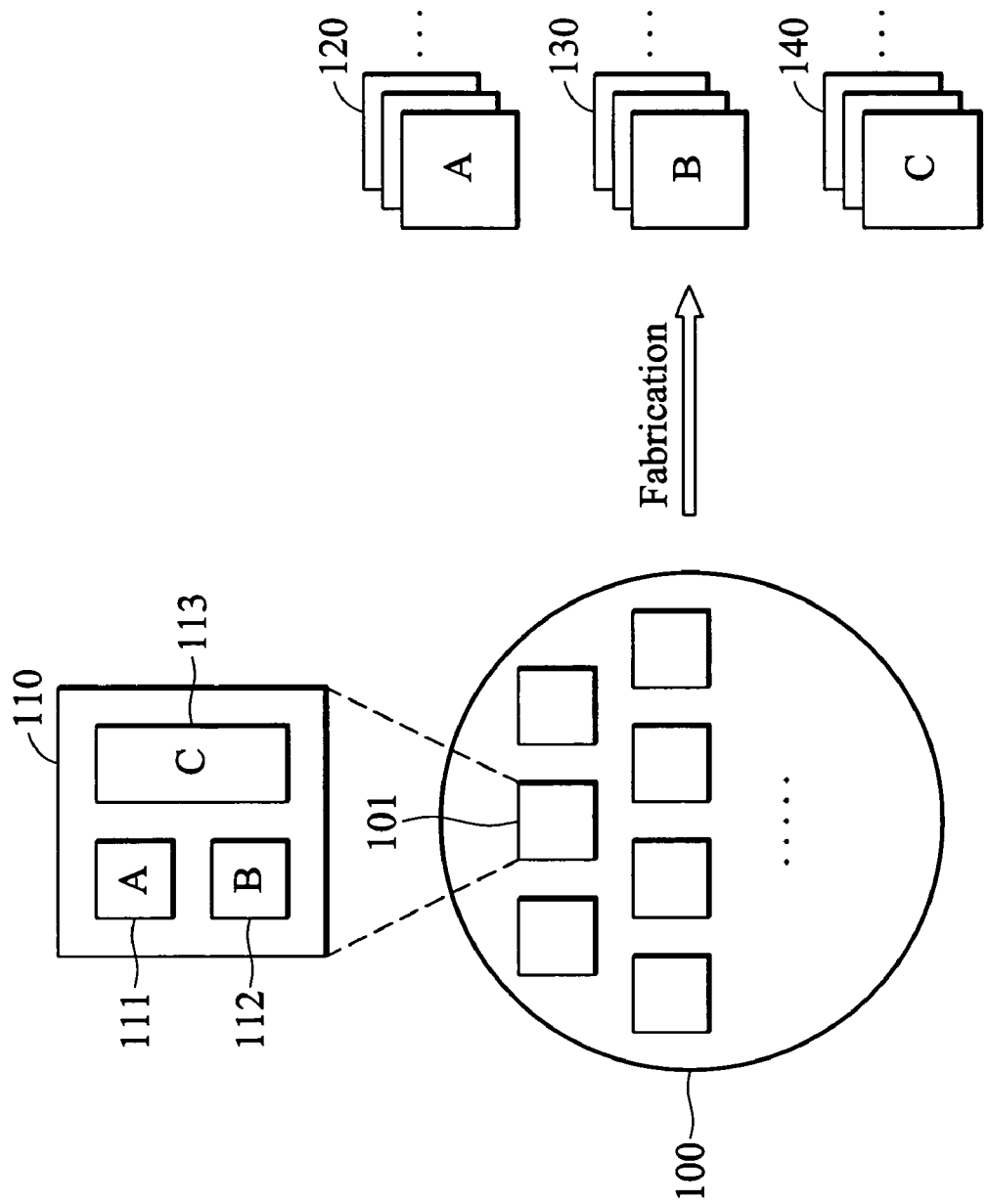
FIG. 1 is a schematic diagram illustrating the MPW shuttle service.
Figure 2:
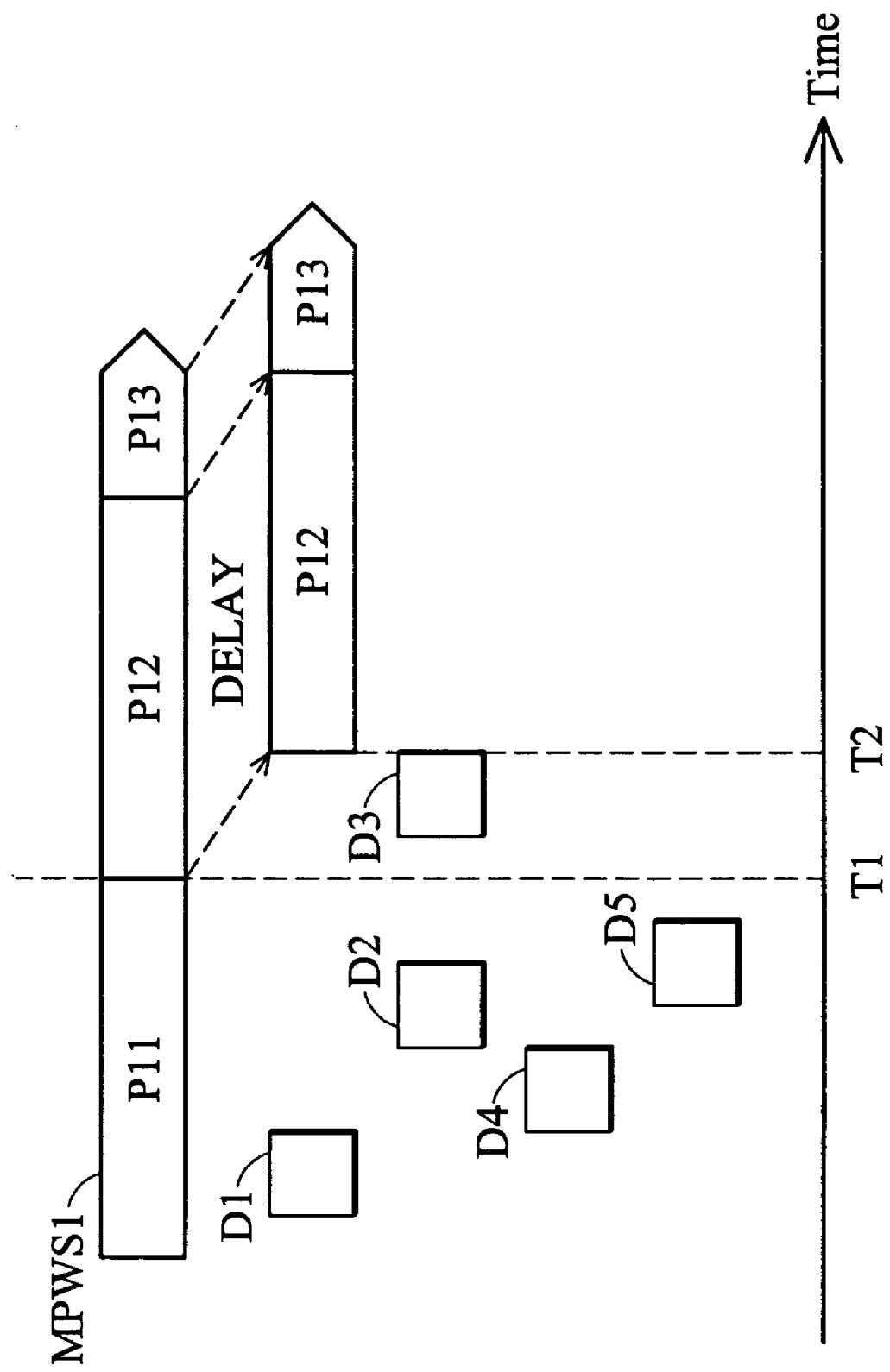
FIG. 2 is an example of an MPW shuttle with a delayed device.
Figure 3:
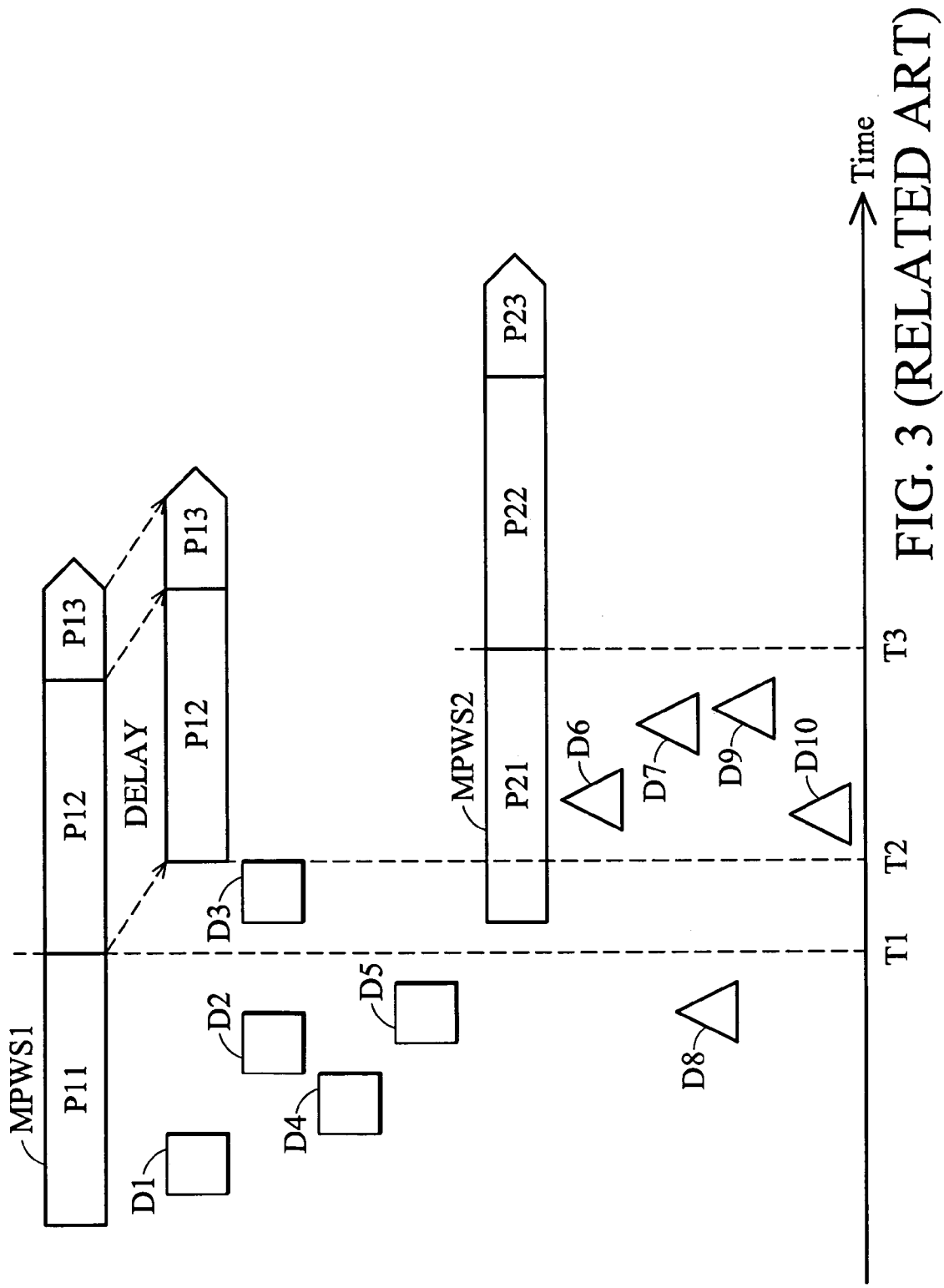
FIG. 3 is an example of two successive MPW shuttles.
Figure 4:
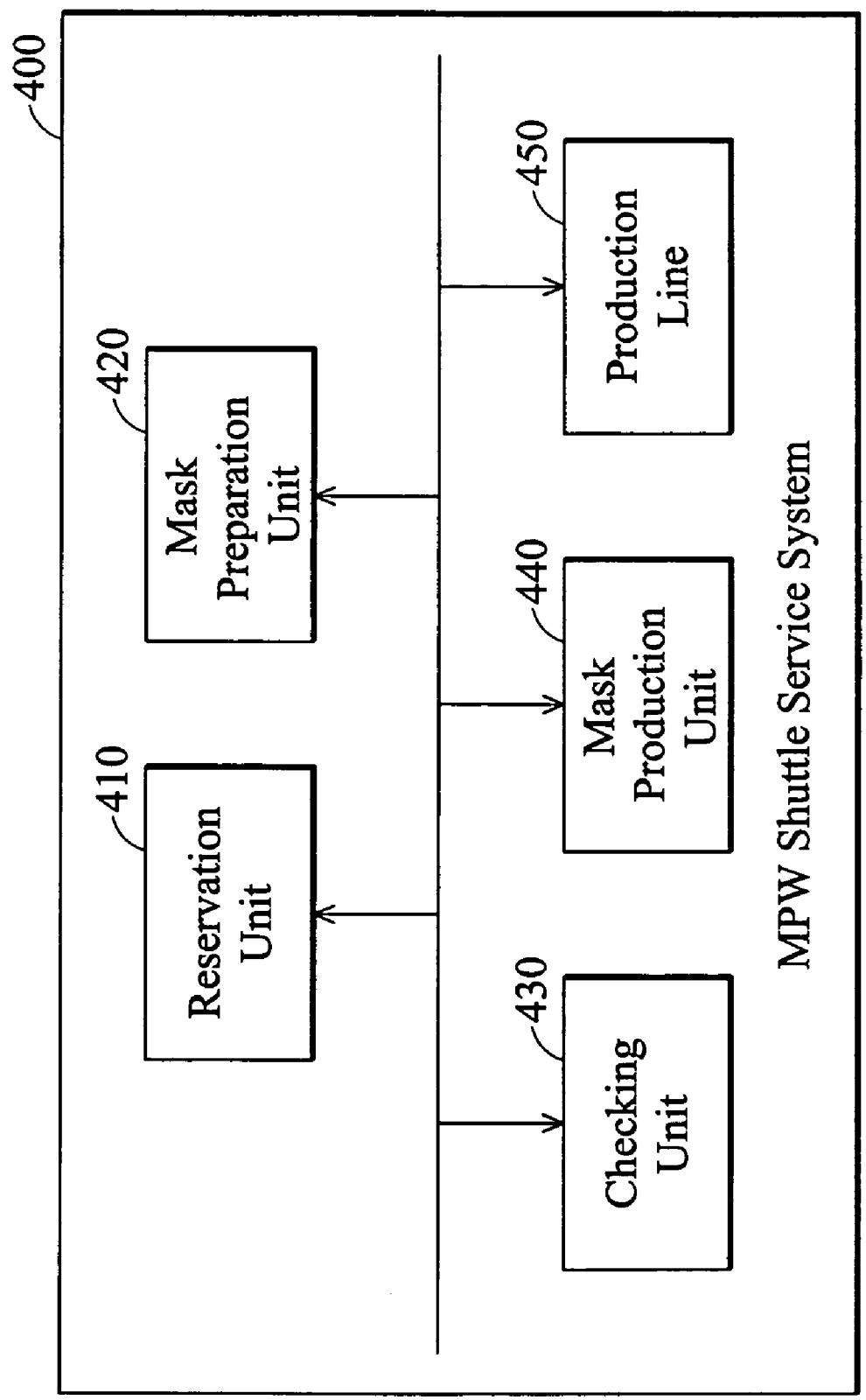
FIG. 4 is a schematic diagram illustrating the system architecture of the MPW shuttle service system according to one embodiment of the present invention.

FIG. 4 illustrates the system architecture of the MPW shuttle service system 400 according to one embodiment of the present invention. The system 400 includes a reservation unit 410, a mask data preparation unit 420, a checking unit 430, a mask production unit 440 and a production line 450.

The reservation unit 410 stores MPW shuttle data, such as the cut off date and reservation status of each MPW shuttle. Clients may access the reservation unit 410 to book a specific MPW shuttle for their device design, in which each MPW shuttle has a corresponding booking record. Once a client books a seat on the specific MPW shuttle, mask data for the booked device design must be provided to the mask data preparation unit 420 before the cut off date of the specific MPW shuttle. In addition, if pull-in demand exists for a specific device, a request may be registered via the reservation unit 410, and the mask data is transmitted in advance to the mask data preparation unit 420.

The checking unit 430 determines if all the mask data for each MPW shuttle has met the corresponding cut off date according to the booking records, and additionally determines whether mask data booked on the corresponding MPW shuttle has been received by the mask data preparation unit 420. The function of the checking unit 430 will be discussed later. The mask production unit 440 produces a common mask for each MPW shuttle according to the corresponding mask data. The production line 450 fabricates wafers for each MPW shuttle using its corresponding mask.

Figure 5:
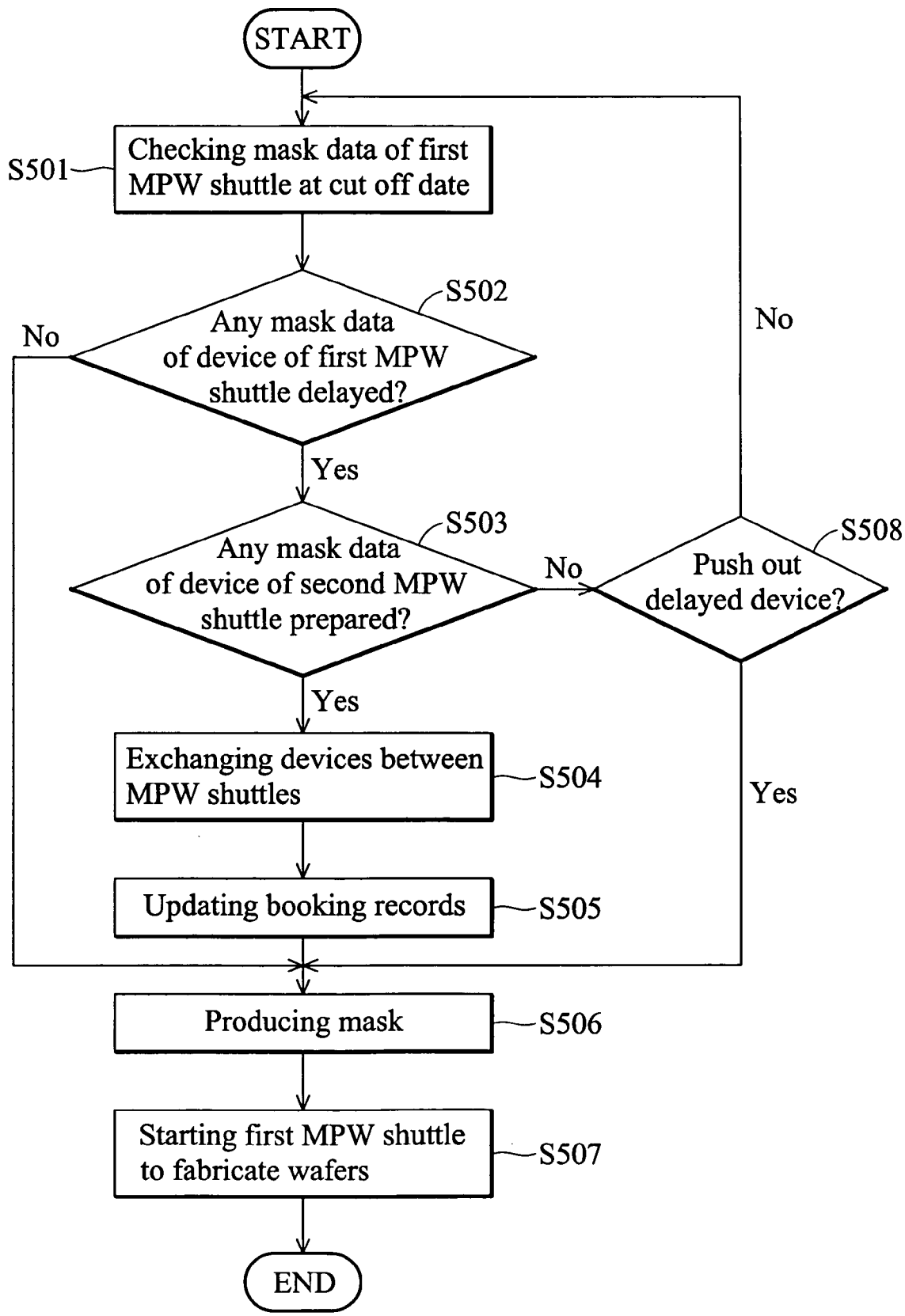
FIG. 5 is a flowchart showing the process of the MPW shuttle service method according to one embodiment of the present invention.

FIG. 5 shows the process of the MPW shuttle service method according to one embodiment of the present invention, in which two MPW shuttles are described, and a first MPW shuttle is reserved for a first group of device designs, while a second MPW shuttle is reserved for a second group of device designs.

In step S501, the checking unit 430 determines whether mask data for the first group has been provided by a cut off date for the first MPW shuttle. If all of the mask data has been provided by the cut off date for the first MPW shuttle (No in step S502), the flow goes to step S506. If the mask data of at least a first target device design has not been provided by the cut off date for the first MPW shuttle (Yes in step S502), in step S503, the checking unit 430 determines whether the mask data of a second target device design in the second group has been provided by the cut off date. If no (as in step S503), in step S508, it is determined whether the first MPW shuttle should push out or wait for the delayed device design. If the first MPW shuttle waits for the delay device design, the flow returns to step S501; otherwise, the flow goes to step S506.

If mask data for the second target device design in the second group has been provided by the cut off date (Yes in step S503), in step S504, the checking unit 430 exchanges the first target device design from the first MPW shuttle with the second target device design from the second MPW shuttle, and in step S505, the corresponding booking records are updated.

It should be noted that, in step S503, the checking unit 430 may further determine whether any pull-in demand exists for a specific device design prior to the cut off date. If so, the checking unit 430 replaces the first target device design from the first MPW shuttle with the specified device design, and finds an appropriate MPW shuttle, for example, the next MPW shuttle, to include the first target device design, and updates the corresponding booking records.

When all the mask data for the first MPW shuttle has been provided, in step S506, the mask production unit 440 produces a common mask according to mask data for the first MPW shuttle. In step S507, the first MPW shuttle is released to the production line 450, and wafer fabrication according to the common mask begins.

Figure 6:
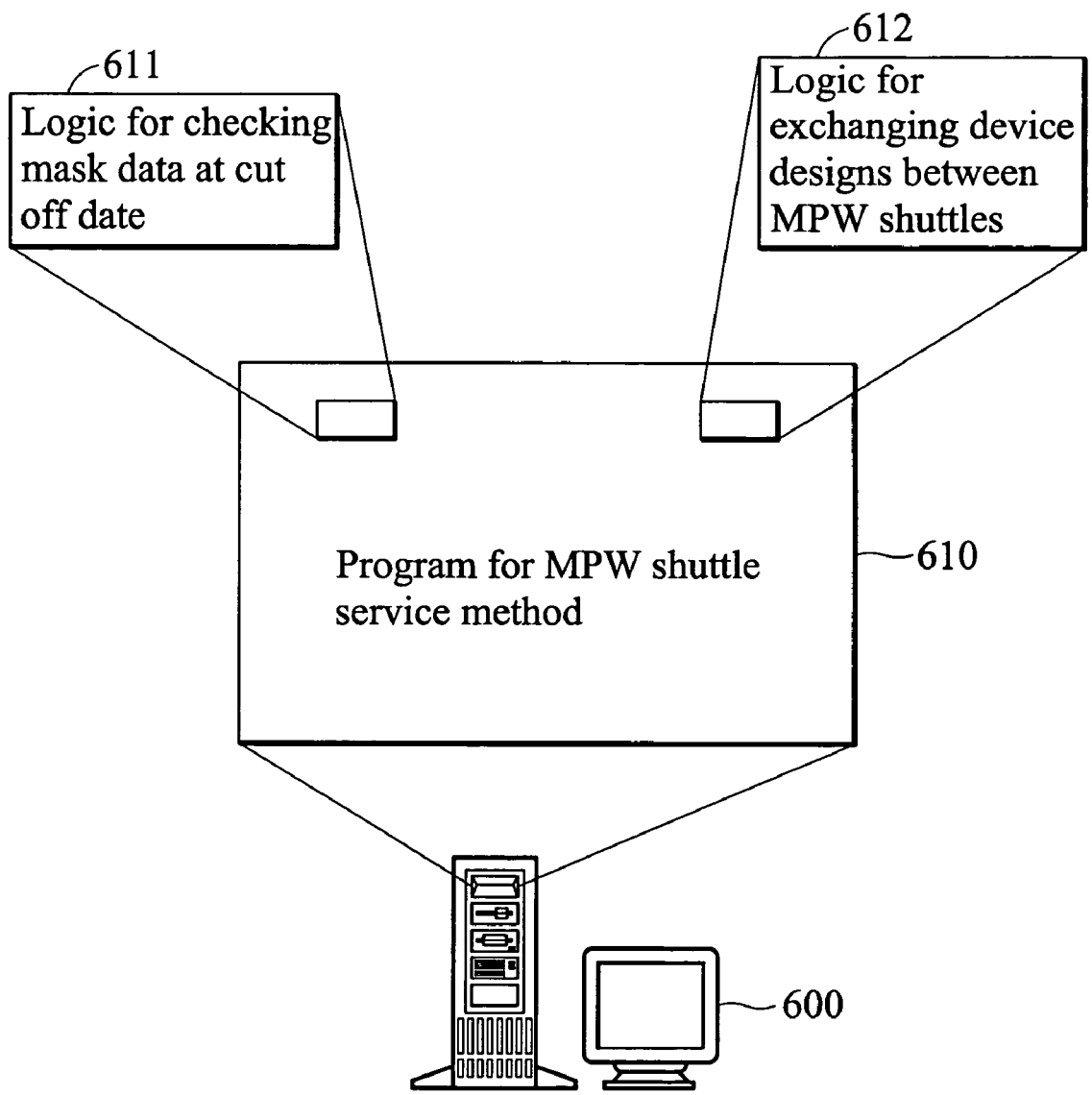
FIG. 6 is a schematic diagram illustrating a storage medium for storing a computer program for execution of the MPW shuttle service method.

FIG. 6 is a diagram of a storage medium for storing a computer program providing the MPW shuttle service method according to the present invention. The computer program product comprises a storage medium 610 having computer readable program code embodied in the medium for use in a computer system 600. The computer readable program code comprises at least computer readable program code 611 for determining whether mask data for a first group reserved on a first MPW shuttle has been provided by a cut off date for the first MPW shuttle, and computer readable program code 612 exchanging a first target device design from the first group with a second target device design from a second group reserved on a second MPW shuttle if the mask data of the first target device design has not been provided and that of the second target device design has been provided by the cut off date.

As a result, the present invention provides clients a mechanism for exchanging devices or device designs between MPW shuttles, thus locating a seat on a successive MPW shuttle for a delayed device and allowing the MPW shuttle to start on schedule. Additionally, the present invention may support a pull-in function, thereby meeting the client requirements, and reducing MPW shuttle costs for the MPW shuttle service provider.

The method and system of the present invention, or certain aspects or portions thereof, may take the form of program code (i.e., executable instructions) embodied in tangible media, such as floppy diskettes, CD-ROMS, hard drives, or any other machine-readable storage medium, wherein, when the program code is loaded into and executed by a machine, such as a computer, the machine becomes an apparatus for practicing the invention. The method and systems of the present invention may also be embodied in the form of program code transmitted over some transmission medium, such as electrical wiring or cabling, through fiber optics, or via any other form of transmission, wherein, when the program code is received and loaded into and executed by a machine, such as a computer, the machine becomes an apparatus for practicing the invention. When implemented on a general-purpose processor, the program code combines with the processor to provide a unique apparatus that operates analogously to application specific logic circuits.

Although the present invention has been described in its preferred embodiments, it is not intended to limit the invention to the precise embodiments disclosed herein. Those skilled in this technology can still make various alterations and modifications without departing from the scope and spirit of this invention. Therefore, the scope of the present invention shall be defined and protected by the following claims and their equivalents.

What is claimed is:

1. A system for MPW (multi-project wafer) shuttle service, comprising:
   a first MPW shuttle reserving for a first group of device designs;
   a second MPW shuttle reserving for a second group of device designs; and
   a checking unit to determine whether mask data for the first group has been provided by a cut off date for the first MPW shuttle, and to exchange a first target device design from the first group with a second target device design from the second group if the mask data of the first target device design has not been provided and that of the second target device design has been provided by the cut off date.

2. The system of claim 1 further comprising a mask production unit to produce a common mask according to the mask data for the first group after the cut off date.

3. The system of claim 2 wherein the checking unit further releases the first MPW shuttle to a production line, and wafer fabrication according to the common mask begins.

4. The system of claim 1 further comprising a reservation unit for booking device designs on the first or second MPW shuttle.

5. The system of claim 4 wherein the checking unit further updates a first booking record of the first MPW shuttle to include the second device design, and updates a second booking record of the second MPW shuttle to include the first device design via the reservation unit.

6. The system of claim 1 further comprising a mask data preparation unit to receive device design mask data.

7. A method for MPW (multi-project wafer) shuttle service, comprising the steps of:
   determining whether device design mask data for a first group reserved on a first MPW shuttle has been provided by a cut off date for the first MPW shuttle; and
   exchanging a first target device design from the first group with a second target device design from a second group reserved on a second MPW shuttle if the mask data of the first target device design has not been provided and that of the second target device design has been provided by the cut off date.

8. The method of claim 7 further comprising producing a common mask according to the mask data in the first group after the cut off date.

9. The method of claim 8 further comprising starting the first MPW shuttle, and fabricating wafers according to the common mask.

10. The method of claim 7 further comprising booking the first MPW shuttle or the second MPW shuttle for the device designs.

11. The method of claim 7 further comprising updating a first booking record of the first MPW shuttle to include the second device design, and updating a second booking record of the second MPW shuttle to include the first device design.

12. The method of claim 7 further comprising receiving the mask data.

13. A machine-readable storage medium storing a computer program which when executed causes a computer to perform a method of MPW (multi-project wafer) shuttle service, comprising the steps of:
   determining whether device design mask data for a first group reserved on a first MPW shuttle has been provided by a cut off date for the first MPW shuttle; and
   exchanging a first target device design from the first group with a second target device design from a second group reserved on a second MPW shuttle if the mask data of the first target device design has not been provided and that of the second target device design has been provided by the cut off date.

14. The storage medium of claim 13 further comprising producing a common mask according to the mask data in the first group after the cut off date.

15. The storage medium of claim 14 further comprising starting the first MPW shuttle, and fabricating wafers according to the common mask.

16. The storage medium of claim 13 further comprising booking the first MPW shuttle or the second MPW shuttle for the device designs.

17. The storage medium of claim 13 further comprising updating a first booking record of the first MPW shuttle to include the second device design, and updating a second booking record of the second MPW shuttle to include the first device design.

18. The storage medium of claim 13 further comprising receiving the mask data.

19. A system for MPW (multi-project wafer) shuttle service, comprising:
   a first MPW shuttle reserving for a first group of device designs;
   a second target device design having a pull-in demand; and
   a checking unit to determine whether mask data from the first group has been provided by a cut off date for the first MPW shuttle, and to exchange a first target device design from the first group with the second target device design if the mask data of the first target device design has not been provided and that of the second target device design has been provided by the cut off date.

20. The system of claim 19 further comprising a mask production unit to produce a common mask according to the mask data in the first group after the cut off date.

21. The system of claim 20 wherein the checking unit further releases the first MPW shuttle to a production line, and wafer fabrication according to the common mask begins.

22. The system of claim 19 further comprising a reservation unit for booking device designs on the first MPW shuttle.

23. The system of claim 22 wherein the checking unit further updates a first booking record of the first MPW shuttle to include the second device design, and updates a second booking record of a second MPW shuttle to include the first device design via the reservation unit.

24. A method for MPW (multi-project wafer) shuttle service, comprising the steps of:
   determining whether device design mask data from a first group reserved on a first MPW shuttle has been provided by a cut off date for the first MPW shuttle; and
   exchanging a first target device design from the first group with a second target device design having a pull-in demand if the mask data for the first target device design has not been provided and that of the second target device design has been provided by the cut off date.

25. The method of claim 24 further comprising producing a common mask according to the mask data from the first group after the cut off date.

26. The method of claim 25 further comprising starting the first MPW shuttle, and fabricating wafers according to the common mask.

27. The method of claim 24 further comprising booking the first MPW shuttle for the device designs.

28. The method of claim 24 further comprising updating a first booking record of the first MPW shuttle to include the second device design, and updating a second booking record of a second MPW shuttle to include the first device design.

29. A machine-readable storage medium storing a computer program which when executed causes a computer to perform a method of MPW (multi-project wafer) shuttle service, comprising the steps of:
   determining whether device design mask data from a first group reserved on a first MPW shuttle has been provided by a cut off date for the first MPW shuttle; and
   exchanging a first target device design from the first group with a second target device design having a pull-in demand if the mask data of the first target device design has not been provided and that of the second target device design has been provided by the cut off date.

30. The storage medium of claim 29 further comprising producing a common mask according to the mask data in the first group after the cut off date.

31. The storage medium of claim 30 further comprising starting the first MPW shuttle, and fabricating wafers according to the common mask.

32. The storage medium of claim 29 further comprising booking the first MPW shuttle for the device designs.

33. The storage medium of claim 29 further comprising updating a first booking record of the first MPW shuttle to include the second device design, and updating a second booking record of a second MPW shuttle to include the first device design.

* * * * *